United States Patent
Chen et al.

(10) Patent No.: US 10,645,681 B2
(45) Date of Patent: May 5, 2020

(54) CONTROL CHANNEL DESIGN FOR MACHINE TYPE COMMUNICATIONS

(71) Applicant: QUALCOMM Incorporated, San Diego, CA (US)

(72) Inventors: Wanshi Chen, San Diego, CA (US); Hao Xu, San Diego, CA (US); Michael Mao Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 14/886,898

(22) Filed: Oct. 19, 2015

(65) Prior Publication Data

US 2016/0112997 A1    Apr. 21, 2016

Related U.S. Application Data

(60) Provisional application No. 62/066,305, filed on Oct. 20, 2014.

(51) Int. Cl.
*H04W 72/04* (2009.01)
*H04W 28/02* (2009.01)
(Continued)

(52) U.S. Cl.
CPC ......... *H04W 72/042* (2013.01); *H04L 5/0053* (2013.01); *H04L 5/0087* (2013.01);
(Continued)

(58) Field of Classification Search
None
See application file for complete search history.

(56) References Cited

U.S. PATENT DOCUMENTS

| 9,294,219 B2 | 3/2016 | Palanki et al. |
| 2013/0039284 A1* | 2/2013 | Marinier ............... H04L 5/001 370/329 |

(Continued)

FOREIGN PATENT DOCUMENTS

| CN | 104065466 A | 9/2014 |
| JP | 2013157699 A | 8/2013 |

(Continued)

OTHER PUBLICATIONS

International Search Report and Written Opinion—PCT/US2015/056409—ISA/EPO—dated Feb. 3, 2016.

(Continued)

*Primary Examiner* — Adnan Baig
(74) *Attorney, Agent, or Firm* — Patterson & Sheridan, L.L.P.

(57) ABSTRACT

Aspects of the present disclosure provide techniques that may be applied in systems to allow for communication over a control channel utilizing a relatively narrow band (e.g., six physical resource blocks) based search space. An exemplary method, performed by a user equipment, generally includes identifying, within a subframe, a first search space to monitor for a downlink control channel that occupies a first number of physical resource blocks (PRBs) that represents a narrowband size and monitoring at least the first search space for the downlink control channel transmitted in the subframe.

31 Claims, 13 Drawing Sheets

(51) Int. Cl.
*H04W 24/08* (2009.01)
*H04W 4/70* (2018.01)
*H04L 5/00* (2006.01)

(52) U.S. Cl.
CPC ............ *H04W 4/70* (2018.02); *H04W 24/08* (2013.01); *H04W 28/0215* (2013.01)

(56) References Cited

U.S. PATENT DOCUMENTS

| | | | |
|---|---|---|---|
| 2013/0083753 A1 | 4/2013 | Lee et al. | |
| 2013/0194931 A1 | 8/2013 | Lee et al. | |
| 2013/0294361 A1 | 11/2013 | Chen et al. | |
| 2014/0119266 A1* | 5/2014 | Ng | H04L 1/0061 370/312 |
| 2015/0215907 A1* | 7/2015 | Takeda | H04L 1/0026 370/329 |
| 2016/0029351 A1* | 1/2016 | Shimezawa | H04L 5/0053 370/329 |
| 2016/0043849 A1* | 2/2016 | Lee | H04W 72/042 370/329 |

FOREIGN PATENT DOCUMENTS

| | | |
|---|---|---|
| WO | 2010039739 A2 | 4/2010 |
| WO | 2014087148 A1 | 6/2014 |

OTHER PUBLICATIONS

IPWIRELESS Inc: "Review of Approaches for Bandwidth Reduction for Low Complexity MTC LTE UES," 3GPP Draft; R1-114267, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 14, 2011-Nov, 18, 2011, Nov. 9, 2011 (Nov. 9, 2011), XP050562333, [retrieved on Nov. 9, 2011].

Sony: "PDCCH Coverage Extension for Low-cost MTC UEs by Power-density Boosting," 3GPP Draft; R1-130960, 3rd Generation Partnership Project {3GPP), Mobile Competence Centre ; 650, Route Des Lucioles ; F-06921 Sophia-Antipolis Cedex ; France vol. Ran Wg1, No. Chicago, USA; Apr. 15, 2013-Apr. 19, 2013 Apr. 5, 2013 (Apr. 5, 2013), XP050696706, Retrieved from the Internet: URL: http://www.3gpp.org/ftp/tsg_ran/WG1_RL1/TSGR1_72b/Docs/- - [retrieved on Apr. 5, 2013].

NTT DOCOMO: "Design of EPDCCH Search Space for Low Cost MTC [online]", 3GPP TSG-RAN WG1#78b, R1-144147, Sep. 27, 2014, URL:http://www.3gpp.org/ftp/tsg_ran/WG1_RL1/TSGR1_78b/Docs/R1-144147.zip, 4 pages.

* cited by examiner

Table: Tone Index vs Symbol Index

| Tone Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 0 | 1 | 2 | 3 | 4 | | | 7 | 8 | 9 | 10 | 11 | 12 | 13 |
| 1 | 12 | 13 | 14 | 15 | 0 | | | 8 | 9 | 10 | 11 | 12 | | |
| 2 | 8 | 9 | 10 | 11 | 12 | 13 | 14 | 15 | 0 | 1 | 2 | 3 | 4 | 5 |
| 3 | 4 | 5 | 6 | 7 | 8 | 9 | 10 | 11 | 12 | 13 | 14 | 15 | 0 | 1 |
| 4 | 0 | 1 | 2 | 3 | 4 | 5 | 6 | 7 | 8 | 9 | 10 | 11 | 12 | 13 |
| 5 | 12 | 13 | 14 | 15 | 0 | | | 2 | 3 | 4 | 5 | 6 | | |
| 6 | 8 | 9 | 10 | 11 | 12 | | | 4 | 5 | 6 | 7 | 8 | | |
| 7 | 4 | 5 | 6 | 7 | 8 | 15 | 2 | 3 | 4 | 5 | 6 | 7 | 8 | 9 |
| 8 | 0 | 1 | 2 | 3 | 4 | 0 | 5 | 13 | 14 | 15 | 0 | 1 | 2 | 3 |
| 9 | 12 | 13 | 14 | 15 | 0 | 1 | 6 | 14 | 15 | 0 | 1 | 2 | 3 | 4 |
| 10 | 8 | 9 | 10 | 11 | 12 | | 7 | 15 | 0 | 1 | 2 | 3 | | |
| 11 | 4 | 5 | 6 | 7 | 8 | | | 0 | 1 | 2 | 3 | 4 | | |

DM-RS REs

FIG. 7A

| PRB pair j | 0 | 1 | 2 | 3 | 4 | 5 | 6 | 7 | 8 | 9 | 10 | 11 | 12 | 13 | 14 | 15 |

FIG. 7B

| | ECCE indexing | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| PRB pair 0 | 0 | 12 | 8 | 4 | 1 | 13 | 9 | 5 | 2 | 14 | 10 | 6 | 3 | 15 | 11 | 7 |
| PRB pair 1 | 4 | 0 | 12 | 8 | 5 | 1 | 13 | 9 | 6 | 2 | 14 | 10 | 7 | 3 | 15 | 11 |
| PRB pair 2 | 8 | 4 | 0 | 12 | 9 | 5 | 1 | 13 | 10 | 6 | 2 | 14 | 11 | 7 | 3 | 15 |
| PRB pair 3 | 12 | 8 | 4 | 0 | 13 | 9 | 5 | 1 | 14 | 10 | 6 | 2 | 15 | 11 | 7 | 3 |

|  | Non-MBSFN 1 Ctrl Sym | Non-MBSFN 2 Ctrl Syms | Non-MBSFN 3 Ctrl Syms | MBSFN 1 Ctrl Sym | MBSFN 2 Ctrl Syms |
|---|---|---|---|---|---|
| ECCE0 | 30 | 27 | 24 | 33 | 30 |
| ECCE1 | 30 | 27 | 24 | 33 | 30 |
| ECCE2 | 30 | 27 | 24 | 33 | 30 |
| ECCE3 | 30 | 27 | 24 | 33 | 30 |

No CSI-RS

*FIG. 8*

|  | Non-MBSFN 1 Ctrl Sym | Non-MBSFN 2 Ctrl Syms | Non-MBSFN 3 Ctrl Syms | MBSFN 1 Ctrl Sym | MBSFN 2 Ctrl Syms |
|---|---|---|---|---|---|
| ECCE0 | 24 | 21 | 18 | 27 | 24 |
| ECCE1 | 30 | 27 | 24 | 33 | 30 |
| ECCE2 | 24 | 21 | 18 | 27 | 24 |
| ECCE3 | 30 | 27 | 24 | 33 | 30 |

3 CSI-RS resources, each of 4 ports
(CSI-RS configuration indices 0, 1 and 2)

*FIG. 9*

CONTROL CHANNEL DESIGN FOR MACHINE TYPE COMMUNICATIONS

CLAIM OF PRIORITY UNDER 35 U.S.C. § 119

This application claims benefit of U.S. Provisional Patent Application Ser. No. 62/066,305, filed Oct. 20, 2014 and entitled "CONTROL CHANNEL DESIGN FOR MACHINE TYPE COMMUNICATIONS," which is herein incorporated by reference in its entirety.

BACKGROUND

I. Field

Certain aspects of the present disclosure generally relate to wireless communications and, more particularly, to control channel designs for certain wireless devices, such as machine type communication(s) (MTC) devices.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

To enhance coverage of certain devices, such as MTC devices, "bundling" may be utilized in which certain transmissions are sent as a bundle of transmissions, for example, with the same information transmitted over multiple subframes.

SUMMARY

Certain aspects of the present disclosure provide techniques and apparatus for communicating control channels to certain devices, such as machine type communication (MTC) UEs.

Certain aspects of the present disclosure provide a method for wireless communications by a user equipment (UE). The method generally includes identifying, within a subframe, a first search space to monitor for a downlink control channel that occupies a first number of physical resource blocks (PRBs) that represents a narrowband size and monitoring at least the first search space for the downlink control channel transmitted in the subframe.

Certain aspects of the present disclosure provide an apparatus for wireless communications by a user equipment (UE). The apparatus generally includes means for identifying, within a subframe, a first search space to monitor for a downlink control channel that occupies a first number of physical resource blocks (PRBs) that represents a narrowband size and means for monitoring at least the first search space for the downlink control channel transmitted in the subframe.

Certain aspects of the present disclosure provide an apparatus for wireless communications by a user equipment (UE). The apparatus generally includes at least one processor configured to identify, within a subframe, a first search space to monitor for a downlink control channel that occupies a first number of physical resource blocks (PRBs) that represents a narrowband size and monitor at least the first search space for the downlink control channel transmitted in the subframe. Additionally, the apparatus generally includes a memory coupled with the at least one processor.

Certain aspects of the present disclosure provide a computer program product for wireless communications by a user equipment (UE) comprising a computer readable medium having instructions stored thereon. The instructions, when executed by at least one processor, causes the processor to identify, within a subframe, a first search space to monitor for a downlink control channel that occupies a first number of physical resource blocks (PRBs) that represents a narrowband size and monitor at least the first search space for the downlink control channel transmitted in the subframe.

Certain aspects of the present disclosure provide a method for wireless communications by a base station (BS). The method generally includes identifying, within a subframe, a first search space for a user equipment (UE) to monitor for a downlink control channel that occupies a first number of physical resource blocks (PRBs) that represents a narrowband size and transmitting one or more downlink control channels to the UE in the first search space.

Certain aspects of the present disclosure provide an apparatus for wireless communications by a base station (BS). The apparatus generally includes means for identifying, within a subframe, a first search space for a user equipment (UE) to monitor for a downlink control channel that occupies a first number of physical resource blocks (PRBs) that represents a narrowband size and means for transmitting one or more downlink control channels to the UE in the first search space.

Certain aspects of the present disclosure provide an apparatus for wireless communications by a base station (BS). The apparatus generally includes at least one processor configured to identify, within a subframe, a first search space for a user equipment (UE) to monitor for a downlink control channel that occupies a first number of physical resource blocks (PRBs) that represents a narrowband size and transmit one or more downlink control channels to the UE in the first search space. Additionally, the apparatus generally includes a memory coupled with the at least one processor.

Certain aspects of the present disclosure provide a computer program product for wireless communications by a base station (BS) comprising a computer readable medium having instructions stored thereon. The instructions, when executed by at least one processor, causes the processor to identify, within a subframe, a first search space for a user equipment (UE) to monitor for a downlink control channel that occupies a first number of physical resource blocks (PRBs) that represents a narrowband size and transmit one or more downlink control channels to the UE in the first search space.

Numerous other aspects are provided including methods, apparatus, systems, computer program products, and processing systems.

BRIEF DESCRIPTION OF THE DRAWINGS

FIG. 7A illustrates an exemplary eCCE definition for a localized ePDCCH, in accordance with certain aspects of the present disclosure.

FIG. 7B illustrates an exemplary eCCE definition for a distributed ePDCCH, in accordance with certain aspects of the present disclosure.

FIGS. 8 and 9 illustrate examples of symbols per eCCE for various subframe configurations, in accordance with certain aspects of the present disclosure.

DETAILED DESCRIPTION

Figure 1:
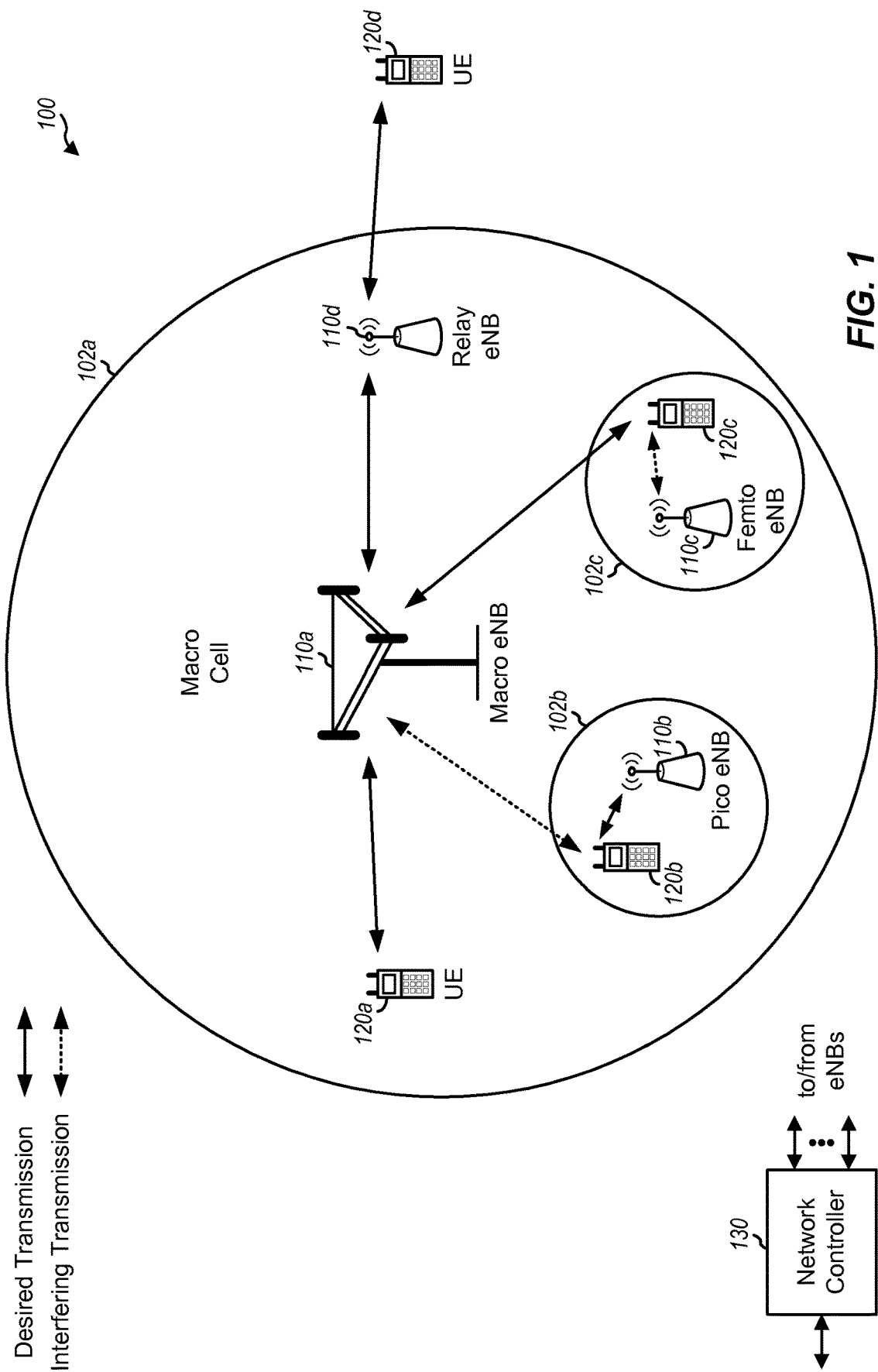
FIG. 1 is a block diagram conceptually illustrating an example of a wireless communication network, in accordance with certain aspects of the present disclosure.

Aspects of the present disclosure provide techniques that may help enable efficient communication between a base station and machine type communication (MTC) based user equipments (UEs). For example, the techniques may provide a design for a control channel targeting MTC UEs, using a narrowband (e.g., a six-PRB) based search space for communication.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart glasses, smart rings, smart bracelets, smart clothing), etc. Some UEs may be considered machine-type communication (MTC) UEs, which may include remote devices, such as drones, robots, sensors, meters, location tags, etc., that may communicate with a base station, another remote device, or some other entity. Machine type communication (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

FIG. 1 illustrates an example wireless communication network 100, in which aspects of the present disclosure may be practiced. For example, techniques presented herein may be used to help UEs and BSs shown in FIG. 1 communicate on a machine type communication physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
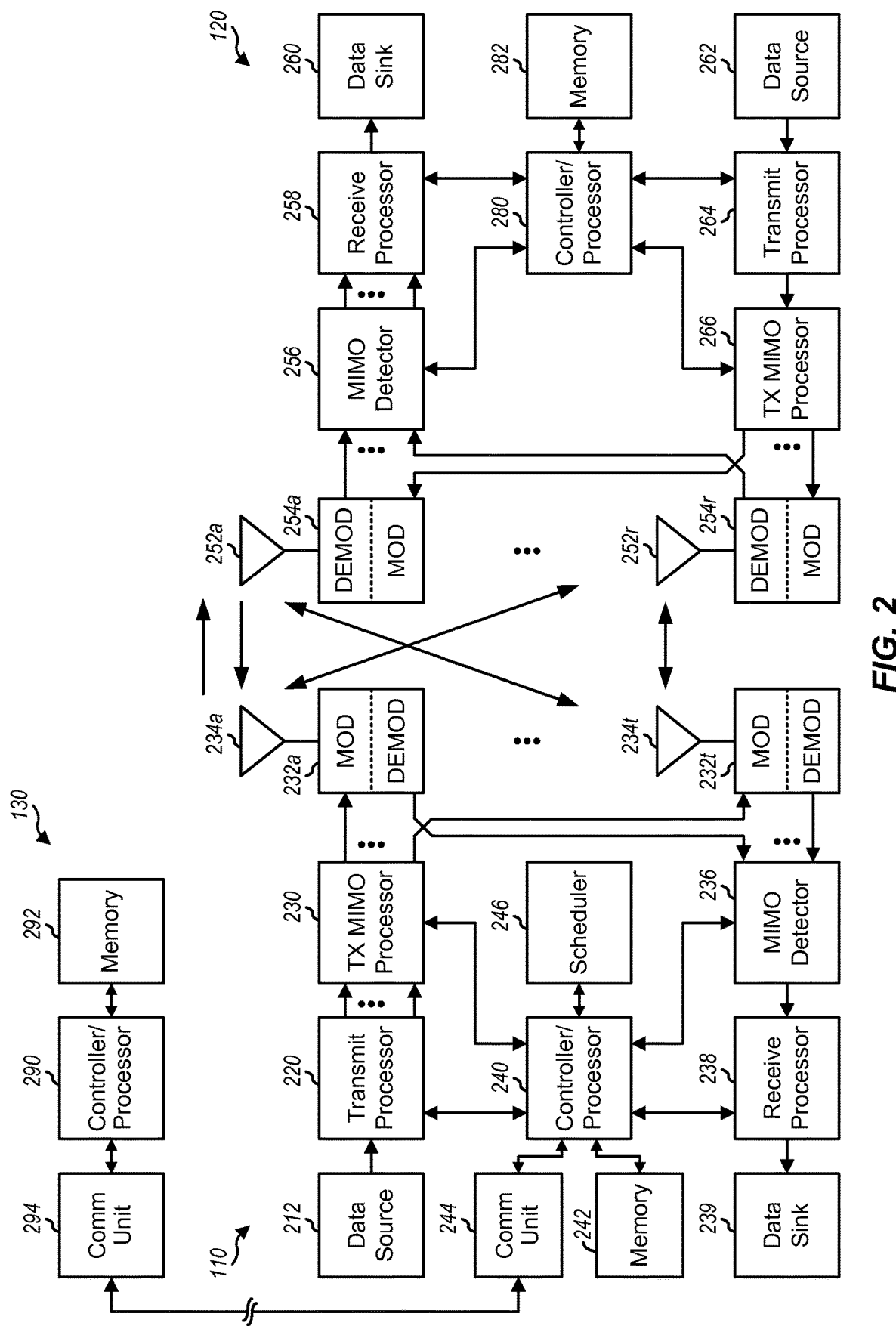
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 1100 shown in FIG. 11. Similarly, processor 280 and/or other processors and modules at UE 120, may perform or direct operations 1000 shown in FIG. 10. Memories 242 and 282 may store data and program codes for base station 110 and UE 120, respectively. A scheduler 246 may schedule UEs for data transmission on the downlink and/or uplink.

Figure 3:
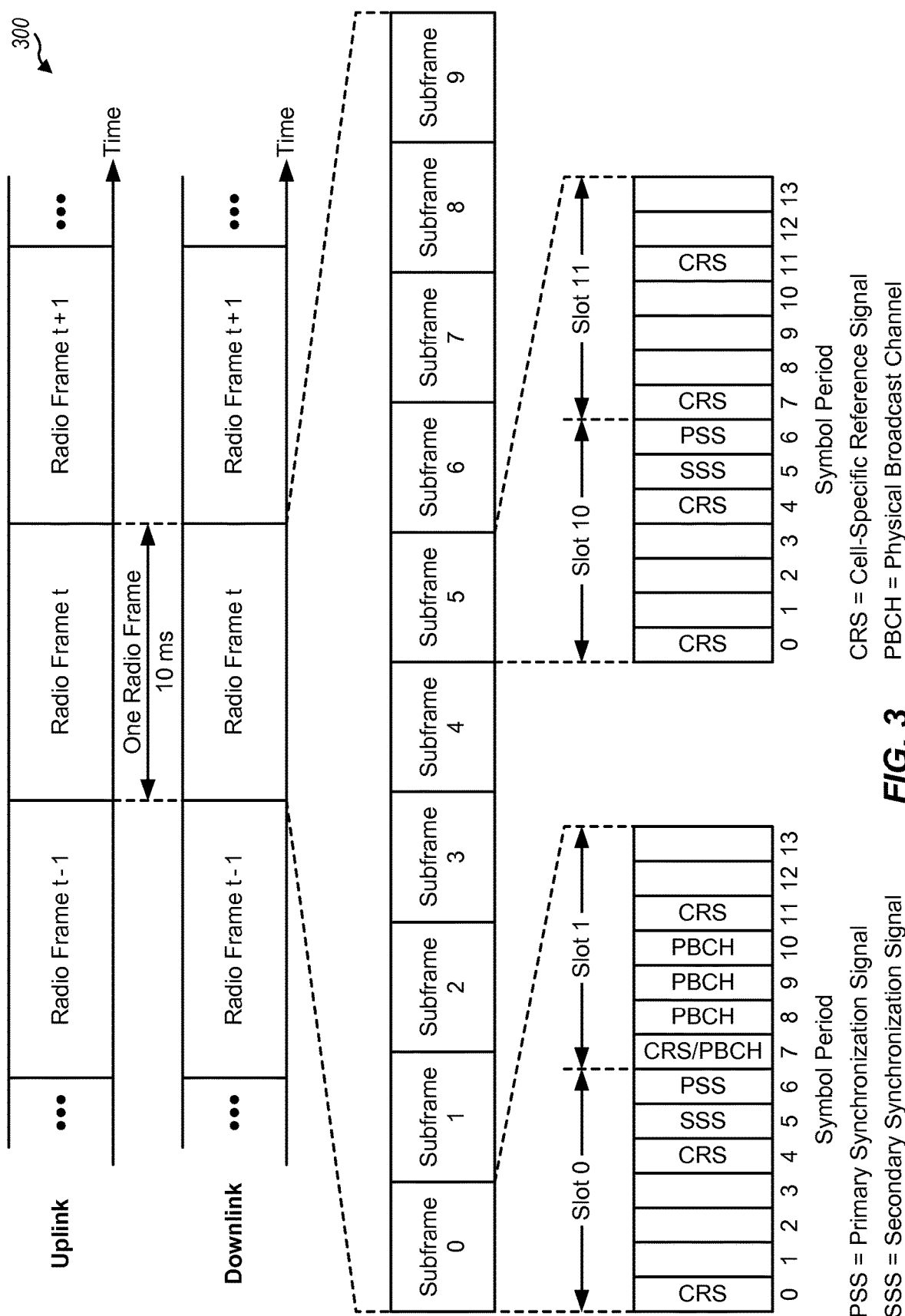
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
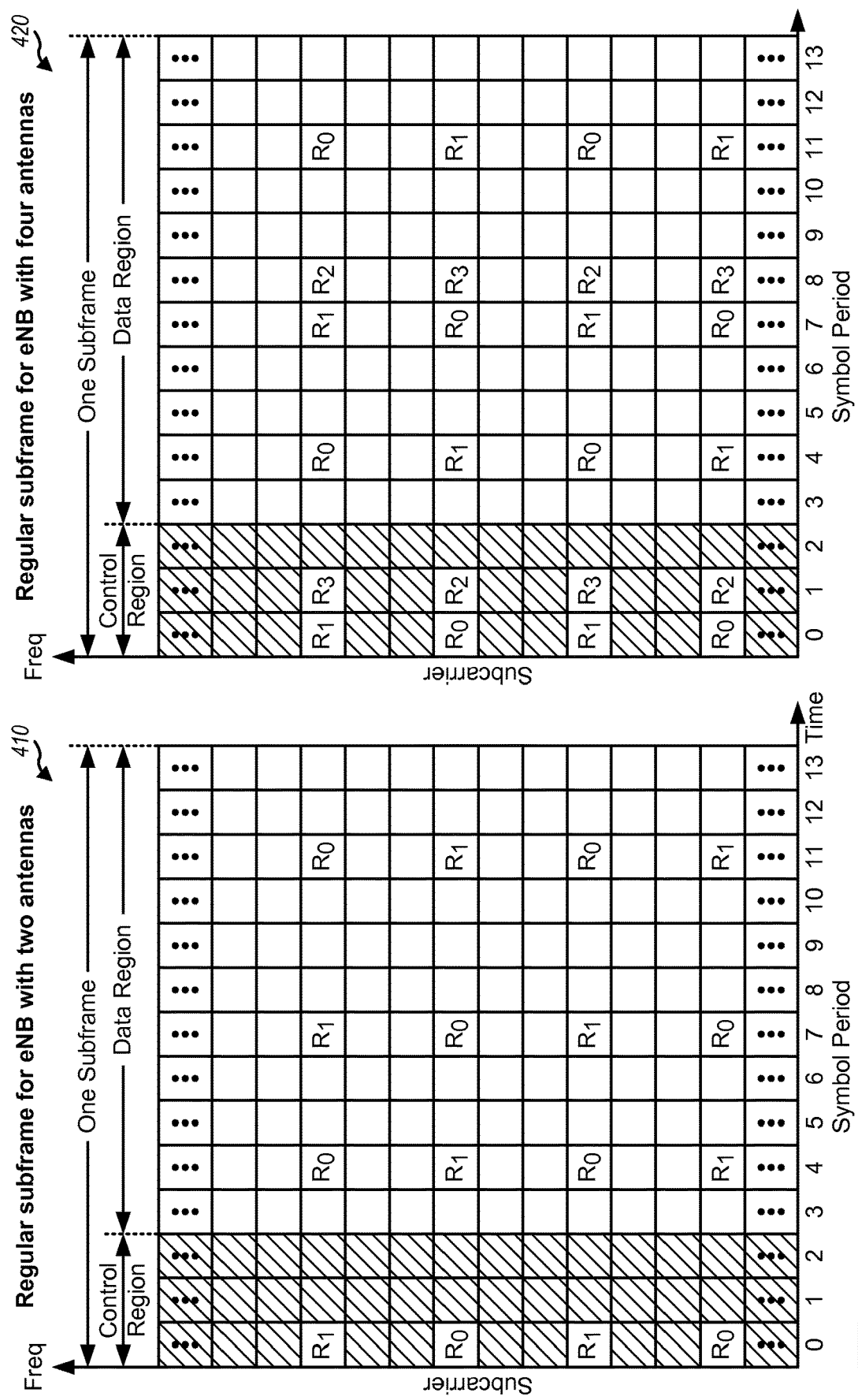
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As noted above, aspects of the present disclosure provide techniques for signalling control channels to machine type communication (MTC) devices using a relatively narrow band of overall system bandwidth.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communication (MTC) or low cost UEs, generally referred to as MTC UEs, various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 µs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
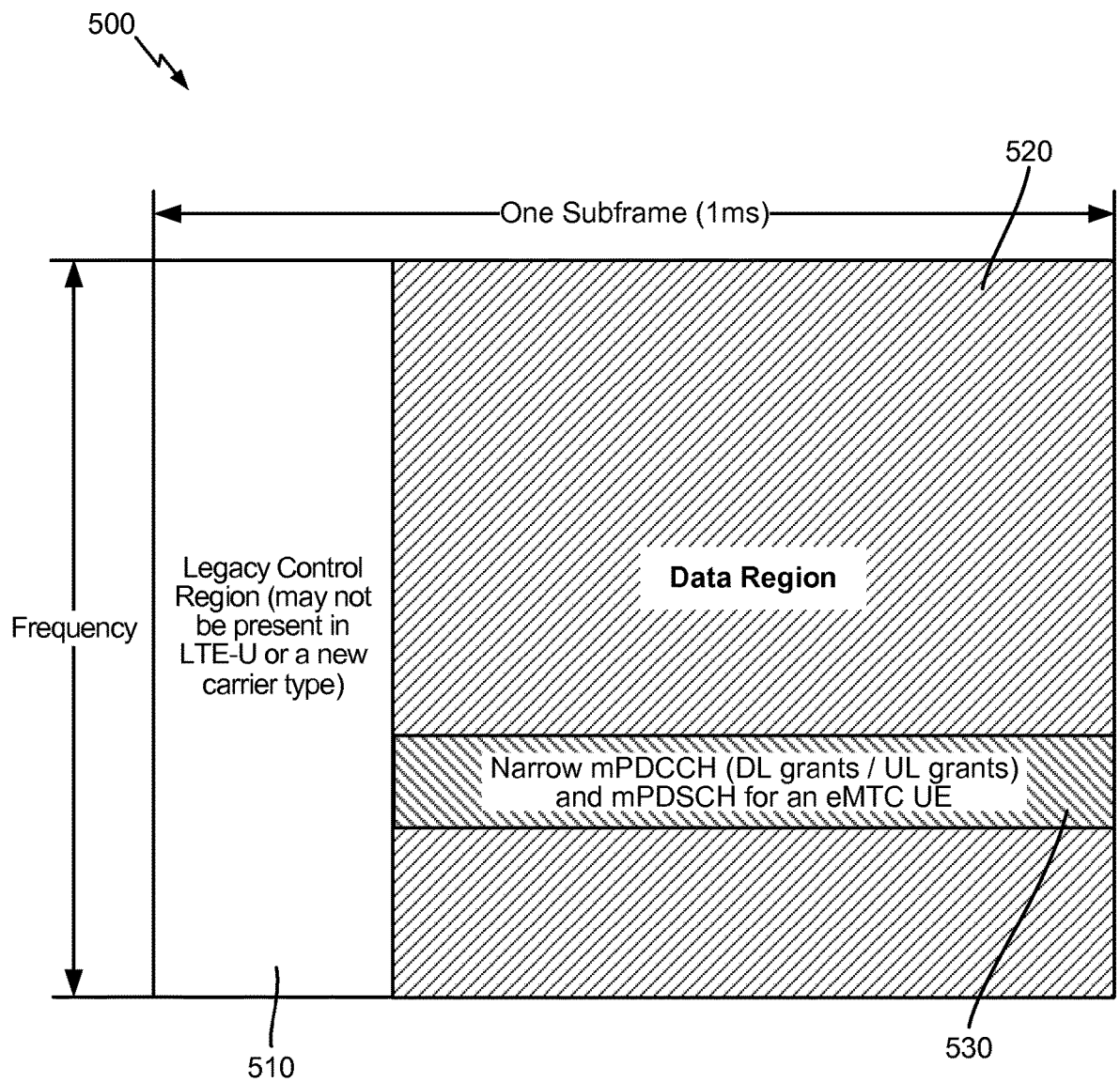
FIG. 5 illustrates an exemplary subframe configuration for eMTC, in accordance with certain aspects of the present disclosure.

As illustrated in the subframe structure 500 of FIG. 5, eMTC UEs can support narrowband bandwidth operation while operating in a wider system bandwidth (e.g., 1.4/3/5/ 10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 physical resource blocks (PRBs). A PRB may comprise 12 consecutive subcarriers for one slot in duration.

However, as noted above, eMTC UEs may be able to operate in a cell with a bandwidth larger than 6 RBs. Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRB blocks).

In Release 11, an enhanced physical downlink control channel (ePDCCH) was introduced. In contrast to the PDCCH which spans a first few symbols in a subframe, the ePDCCH is frequency division multiplexing (FDM) based and spans (symbols of) the entire subframe. Additionally, as compared to the conventional PDCCH CRS support, the ePDCCH may only support demodulation reference signals (DM-RS).

In some cases the ePDCCH may be UE-specifically configured. For example, each UE in a network may be configured to monitor a different set of resources for the ePDCCH. Additionally, the ePDCCH supports two modes of operation: localized ePDCCH, in which a single precoder is applied to each PRB, and distributed ePDCCH, in which two precoders cycle through the allocated resources within each PRB pair.

The ePDCCH may be constructed based on enhanced resource element groups (eREGs) and enhanced control channel elements (eCCEs). Generally, an eREG is defined based on excluding DM-RS REs, assuming a maximum amount of DM-RS (e.g., 24 DM-RS REs for normal cyclic prefix and 16 DM-RS REs for extended cyclic prefix) and including any non-DM-RS REs (e.g., REs that do not carry DM-RS). Thus, for normal cyclic prefix, the number of REs available for the ePDCCH is 144 (12 subcarriers–14 symbols–24 DM-RS=144 REs), and, for extended cyclic prefix, the number of REs available for the ePDCCH is 128 (12 subcarriers*12 symbols–16 DM-RS=128 REs).

In some cases, a PRB pair is divided into 16 eREGs, regardless of subframe type, cyclic prefix type, PRB pair index, subframe index, etc. Thus, for normal cyclic prefix, there are 9 REs per eREG and 8 REs per eREG for extended cyclic prefix. In some cases the eREG to RE mapping may follow a cyclic/sequential and frequency-first-time-second manner, which may be beneficial for equalizing the number of available REs per eREG. Additionally, due to the presence of other signals, the number of available REs for the ePDCCH may not be fixed and can be different for different eREGs in a PRB pair.

Figure 6:
FIG. 6 illustrates a time/frequency grid of resource elements (REs), in accordance with certain aspects of the present disclosure.

FIG. 6 shows an example time/frequency grid of REs that illustrates 16 eREGs sequentially defined in one PRB pair, excluding DM-RS REs. As illustrated, the eREG to RE mapping may sequentially map REs of each eREG, in a frequency-first, then time manner. That is, starting at RE (0, 0), the eREG index increases sequentially by increasing tone index and then increasing symbol index. The number associated with each RE denotes the eREG index (0-15). For example, the 9 "15"s in FIG. 6 are the 9 Res that make up eREG index 15. As noted above, the number of REs per eREG may be fixed at 9 for normal cyclic prefix. Additionally, as pictured, 24 DM-RS REs are not associated with any eREG.

In some cases, the number of eREGs per eCCE may be either four or eight. If normal cyclic prefix is used and a normal subframe or special subframe configurations 3, 4, or 8 (e.g., when the number of REs/PRB pair is large) are used, the number of eREGs per eCCE may be four (N=4), which corresponds to four eCCEs per PRB pair. Otherwise, the number of eREGs per eCCE may be eight (N=8).

In some cases, eCCEs may be further based on an eREG grouping concept. For example, regardless of localized or distributed ePDCCH, 4 eREG groups may be formed: Group #0: eREGs {0,4,8,12}; Group #1: eREGs {1,5,9,13}; Group #2: eREGs {2,6,10,14}; Group #3: eREGs {3,7,11,15}, where the numbers inside the braces indicate the eREG index as pictured in FIG. 6. In some cases, when an eCCE is formed by four eREGs, an eCCE may be formed by one eREG group. Additionally, when an eCCE is formed by eight eREGs, an eCCE may be formed by two eREG groups, which may be either group numbers 0 and 2 or 1 and 3.

In some scenarios, the location of eREGs of an eREG group may depend on the ePDCCH mode. For example, for a localized ePDCCH, eREGs of the same group may always come from the same PRB pair. For a distributed ePDCCH, eREGs of the same group may come from different PRB pairs. The detailed mapping depends on the number of PRB pairs configured for ePDCCH.

As illustrated in FIG. 7A, for a localized ePDCCH, each eCCE may be defined within one PRB pair (e.g., as illustrated, a single PRB pair j). For example, each different pattern illustrated in FIG. 7A may represent one eCCE where the value in each box represents the eREG index. For example, as can be seen, eREG numbers 0, 4, 8, and 12 have the same pattern, which represents Group #0.

As illustrated in FIG. 7B, for a distributed ePDCCH, each eCCE may be defined across different PRB pairs (e.g., PRB pairs 0-3). For example, as illustrated in FIG. 7B, eCCE #0 consists of eREG 0 of PRB pair 0, eREG 4 of PRB pair 1, eREG 8 of PRB pair 2, and eREG 12 of PRB pair 3. The four PRB pairs illustrated in FIG. 7B may not be contiguous in frequency (e.g., the PRB pairs may be frequency distributed).

As illustrated in FIG. 8, similar to eREG design, the number of available REs per eCCE for ePDCCH may not be fixed and may be different for different eCCEs. However, as illustrated in FIG. 9, an eREG grouping based eCCE definition may potentially help equalize the number of available REs per eCCE, assuming two CRS ports, normal cyclic prefix, and normal subframes.

In some cases, each UE may be configured with up to two ePDCCH resource sets (K=2), where each resource set is separately configured with M=2, 4, or 8 PRB pairs. Additionally, each ePDCCH resource set may be separately configured with either a localized or distributed mode.

In some cases, for a search space of a localized ePDCCH, the candidates of a given aggregation layer (AL) may be spaced in as many different PRB pairs as possible so as to exploit sub-band scheduling for the ePDCCH as much as possible. On the other hand, the search space for a distributed ePDCCH may be similar to a legacy PDCCH. In some cases (e.g., for LTE Release 11), REs occupied by other signals known to the UE (e.g., legacy control region, CRS, UE-specifically configured CSI-RS) may be rate-matched around the ePDCCH.

As noted above, for normal UEs, an ePDCCH resource set may be configured with two, four, or eight PRB pairs.

However, certain MTC UEs may be configured to operate in a narrowband, for example, using six PRB pairs, which may not match one of the defined ePDCCH resource set configurations. However, aspects of the present disclosure provide solutions for communicating on a control channel using such a narrowband that does not match a current ePDCCH resource set.

Figure 10:
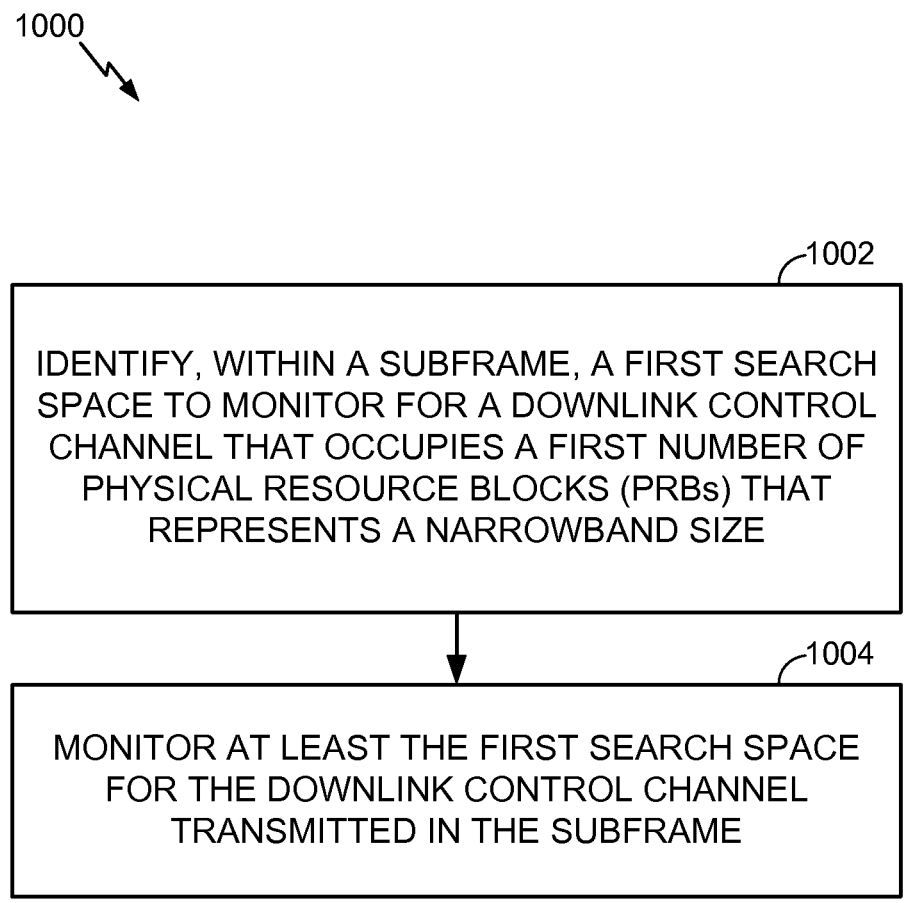
FIG. 10 illustrates example operations for wireless communications, by a user equipment (UE), in accordance with certain aspects of the present disclosure.

FIG. 10 illustrates example operations 1000 that may be performed by a user equipment (UE), such as an MTC or eMTC UE (e.g., one or more of the UEs 120). Operations 1000 begin, at 1002, by identifying, within a subframe, a first search space to monitor for a downlink control channel that occupies a first number of physical resource blocks (PRBs) that represents a narrowband size. According to certain aspects, the downlink control channel may comprise a machine type communication physical downlink control channel (mPDCCH). At 1004 the UE monitors at least the first search space for the downlink control channel transmitted in the subframe. The UE receives the downlink control channel transmitted in the subframe based, at least in part, on the monitoring (not pictured). In some aspects, the receiving comprises receiving information on the downlink control channel using one subframe or a set of subframes (e.g., the set of subframes comprises two or more subframes).

Figure 11:
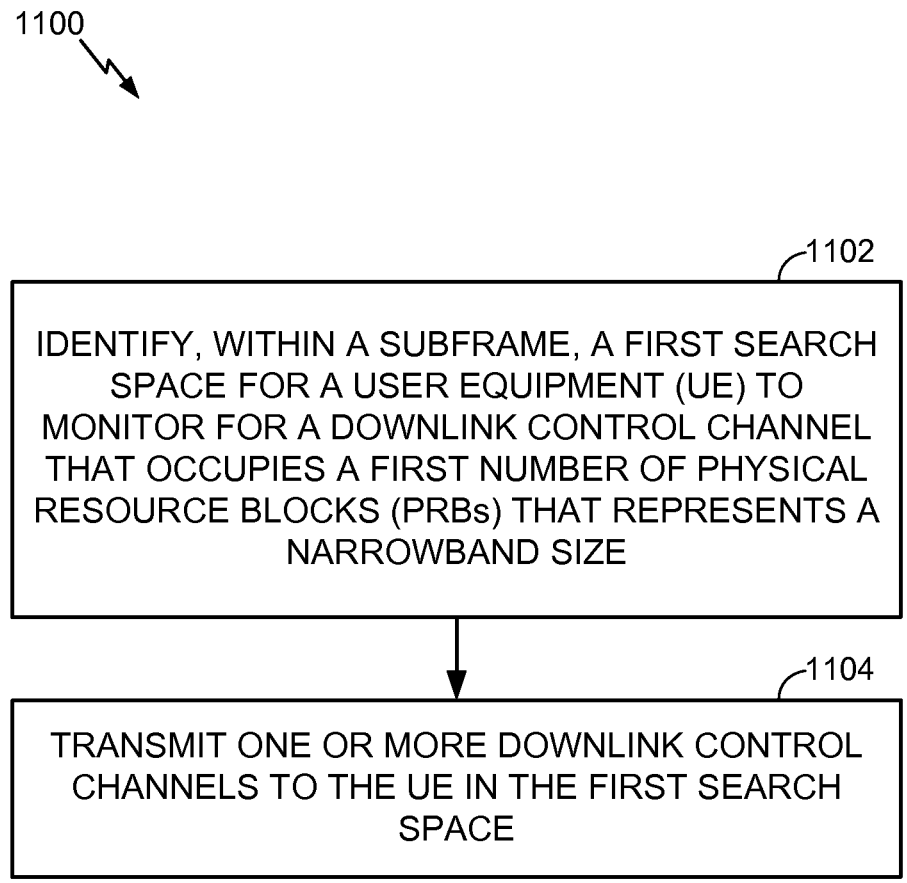
FIG. 11 illustrates example operations for wireless communications, by a base station (BS), in accordance with certain aspects of the present disclosure.

FIG. 11 illustrates example operations 1100 that may be performed by a base station (BS) (e.g., BS 110), for communicating with a user equipment (UE), such as an MTC or eMTC UE. The operations 1100 may be considered complementary to operations 1000 of FIG. 10.

Operations 1100 begin, at 1102, by identifying, within a subframe, a first search space for a user equipment (UE) to monitor for a downlink control channel that occupies a first number of physical resource blocks (PRBs) that represents a narrowband size. At 1104, the BS transmits one or more downlink control channels to the UE in the first search space. In some aspects, the transmitting comprises transmitting information on the one or more downlink control channels using one subframe or a set of subframes (e.g., the set of subframes comprises two or more subframes).

Examples below assume a narrowband size of six-PRBs. Those skilled in the art will recognize, however, that these are examples only and that the techniques presented herein may be more broadly applied to different sizes of narrowband regions (e.g., narrowband sizes) of a wider system bandwidth. In aspects, a size of the narrowband region may depend on a category of a UE or a capability of the UE. For example, MTC-type UEs may communicate using a smaller region of bandwidth than non-MTC UEs.

As used herein, the term decoding candidate generally refers to a discrete set of resources within a search space that might carry a channel to be decoded (e.g., a downlink control channel). Thus, a search space typically accommodates a number of different decoding candidates, with the number depending on various factors (such as the size of decoding candidates and whether decoding candidates are allowed to overlap). As described in more detail below, aspects of the present disclosure provide different search space options, each with corresponding decoding candidates, for transmitting a control channel. Thus, depending on the search space options, a base station will select from available decoding candidates for transmitting a control channel, while a UE, in turn, will monitor the different possible decoding candidates of each search space accordingly.

Figure 12:
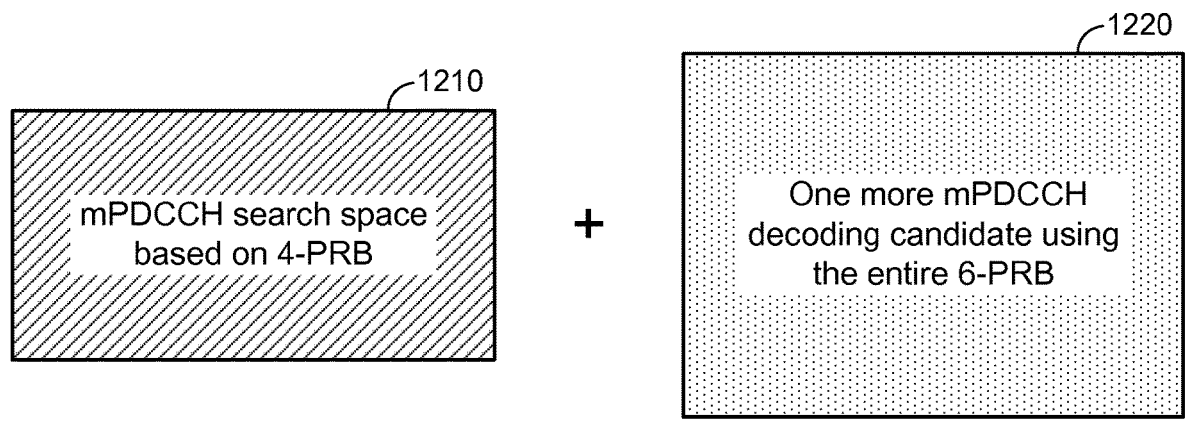
FIGS. 12-15 illustrate example control channel search space configurations, in accordance with certain aspects of the present disclosure.

As illustrated in FIG. 12, one solution to allow for communication on a control channel utilizing a six-PRB based search space may be to have an MTC UE monitor all decoding candidates corresponding to a two PRB search space and/or a four PRB search space 1210, as well as one more candidate 1220 that occupies all six PRBs. While this may mean that some UEs may share two-PRB and/or four PRB search spaces, but if the remaining PRBs are used for a UE mPDCCH, the entire six PRBs are used for the mPDCCH.

Thus, monitoring at 1004 may comprise monitoring a first search space for a downlink control channel decoding candidate spanning a first number of PRBs (e.g., six PRBs) and also monitoring at least one of a second search space or a third search space for a downlink control channel decoding candidate spanning the second and/or third search spaces. In aspects, the first search space may comprise six PRBs and the second and/or third search spaces may comprise one, two, or four PRBs. Additionally, in aspects, the second and/or third search spaces may comprise PRBs occupied by a another downlink control channel (e.g., an enhance physical downlink control channel (ePDCCH)).

Correspondingly, transmitting (1104) may comprise transmitting one or more of the downlink control channels using resources in the first search space corresponding to a downlink control channel decoding candidate spanning the first number of PRBs or using resources in at least one of the second search space or the third search space corresponding to a downlink control channel decoding candidate spanning a fewer number of PRBs than the first number of PRBs.

Additionally, according to certain aspects, the first search space (e.g., a search space occupying six PRBs, as noted above) may comprise a combination of the second and third search spaces (e.g., the two and four-PRB search spaces). Thus, in some cases, monitoring 1004 may comprise monitoring the first search space for a decoding candidate, transmitted by the base station (e.g., at 1104), with resources in both the second and third search spaces. In some cases, the first search space may comprise a single decoding candidate.

According to certain aspects, the downlink control channel (e.g., the mPDCCH) may be transmitted using a set of subframes (e.g., two or more subframes). In this case, monitoring (1004) may comprise monitoring the set of subframes for the mPDCCH, wherein the set of subframes to monitor is determined/identified based, at least in part, on an indication received from a serving network (e.g., the UE's serving base station). That is, the UE's serving base station may transmit an indication to the UE of the set of subframes that the UE should monitor for the mPDCCH.

Figure 13:
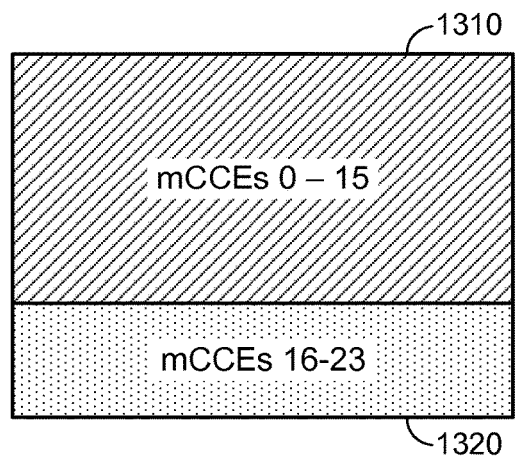

Another solution to allow for communication on a control channel using a six-PRB based search space, as illustrated in FIG. 13, may be to define a six-PRB-based search space as a direct combination of the four-PRB search space 1310 and two-PRB based search space 1320. For example, with the four-PRB block or the two-PRB block, an mREG/mCCE (e.g., the MTC resource element group and MTC control channel element, respectively) may be defined in the same manner as the eREG/eCCE of the ePDCCH. However, the mPDCCH search space may be defined based on mCCEs from the two blocks. For example, the mPDCCH search space may be defined based on a total of 24 mCCEs, as illustrated in FIG. 13.

According to certain aspects, one decoding candidate may have CCEs from two blocks. For example, a candidate of aggregation level 16 may have 8 CCEs from the first block and 8 CCEs from the second block. According to certain aspects, the CCE indexing may be predefined, for example, by indexing the four-PRB based search space first followed by the two-PRB based search space or the two-PRB based search space first followed by the four-PRB based search space. According to certain aspects, different UEs may have a different indexing scheme or the same indexing scheme.

Thus, monitoring (1004) may comprise monitoring for a decoding candidate having CCEs from two blocks (e.g., the two-PRB search space and the four-PRB search space) according to a predefined CCE index. That is, monitoring (1004) may comprise searching within the a first search space (e.g., a combination of the two-PRB search space and the four-PRB search space) using a mapping of CCEs to resource element groups (REGs) based on the size of the first search space. In some cases, the first search space in divided into a first set of control channel elements (CCEs) of a first size corresponding to the second search space and a single CCE corresponding to the third search space According to certain aspects, defining a six-PRB based search space by a direct combination of the four-PRB and two-PRB based search spaces may enable better sharing of the ePDCCH.

Figure 14:
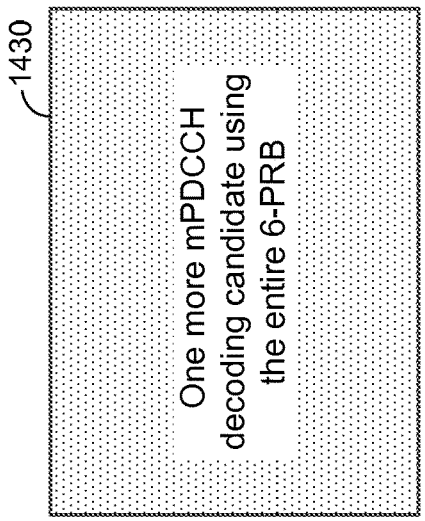
Figure 14:
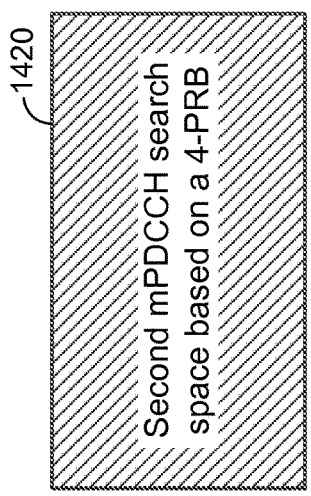
Figure 14:

As illustrated in FIG. 14, another solution to allow for communication on a control channel using a six-PRB based search space may be to have a UE configured with two mPDCCH resource sets (e.g., two-PRB search space 1410 and four-PRB search space 1420). In this case, the UE may be required to monitor decoding candidates separately defined within each resource set and also one more decoding candidate 1430 spanning the entire six PRBs. For example, as illustrated in FIG. 14, the UE may be designed to monitor for decoding candidates in a first mPDCCH search space based on two-PRBs, a second mPDCCH search space based on four-PRBs, and another search space using the entire six-PRBs. In other words, the 6-PRB candidate is possible when the total mPDCCH resource set size is 6-PRB. Thus, according to certain aspects, transmitting (1104) may comprise transmitting the mPDCCH according to different sets of downlink control channel decoding candidates within each of the first search space (e.g., the two-PRB search space), the second search space (e.g., the four-PRB search space), and the third search space (e.g., the six-PRB search space). Additionally, monitoring (1004) may comprise monitoring for downlink control channel decoding candidates within each of the first, second, and third search spaces.

In some cases, for communicating on a control channel using a six-PRB based search space, an mCCE to mREG mapping (e.g., based on six PRBs) may be defined.

Figure 15:
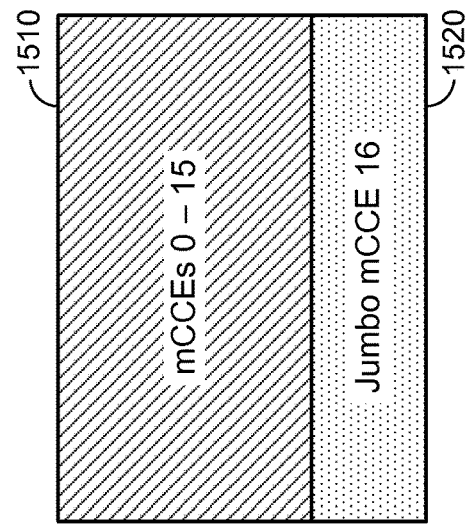

As illustrated in FIG. 15, one solution for communication on a six-PRB based search space may be to search a four-PRB search space 1510 and treat a two-PRB block as a single large ("jumbo") CCE 1520 as part of the search space. This large CCE 1520 may be combined with regularly defined mCCEs (e.g., of four-PRB search space 1510). For example, a UE may monitor a decoding candidate using mCCE 15 and the large mCCE 16 or mCCE 0-15 and the large mCCE 16 for all six-PRBs.

As noted above, aspects of the present disclosure provide various techniques for signalling control channels to machine type communication (MTC) devices using a relatively narrowband of overall system bandwidth.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for identifying and/or means for monitoring may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EPROM, EEPROM, flash memory, phase change memory, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   identifying, within a subframe, a first search space spanning a first number of physical resource blocks (PRBs) that represents a narrowband size;
   monitoring the first search space for a first downlink control channel decoding candidate;
   monitoring a second search space spanning a second number of PRBs for a second downlink control channel decoding candidate, wherein the second number of PRBs is fewer than the first number of PRBs; and
   monitoring a third search space spanning a third number of PRBs for a third downlink control channel decoding candidate, wherein the third number of PRBs is fewer than the first number of PRBs and the second number of PRBs, wherein:
   the first search space comprises a combination of the second search space and the third search space; and
   the first downlink control channel decoding candidate comprises a first number of control channel elements (CCEs) in the second search space and a second number of CCEs in the third search space.

2. The method of claim 1, wherein the second number of PRBs comprises one of one, two, or four PRBs.

3. The method of claim 1, wherein the first number of PRBs comprises six PRBs.

4. The method of claim 1, wherein the first search space comprises a single downlink control channel decoding candidate.

5. The method of claim 1, wherein the first, second, or third downlink control channel decoding candidate is transmitted utilizing a set of subframes, and wherein the set of subframes comprises two or more subframes.

6. The method of claim 5, further comprising monitoring for the set of subframes, and wherein the set of subframes is determined based, at least in part, on an indication received from a network.

7. The method of claim 1, wherein the narrowband size is within a wider system bandwidth.

8. The method of claim 1, wherein the narrowband size is based on at least one of a category of the UE or a capability of the UE.

9. A method for wireless communications by a base station (BS), comprising:
   identifying, within a subframe, a first search space spanning a first number of physical resource blocks (PRBs) that represents a narrowband size;
   transmitting resources in the first search space corresponding to a first downlink control channel decoding candidate for a user equipment (UE) to monitor;
   transmitting resources in a second search space corresponding to a second downlink control channel decoding candidate for the UE to monitor, wherein the second search space spans a second number of PRBs that is fewer than the first number of PRBs; and
   transmitting resources in a third search space corresponding to a third downlink control channel decoding candidate for the UE to monitor, wherein the third search space spans a third number of PRBs that is fewer than the first number of PRBs and the second number of PRBs, wherein:
   the first search space comprises a combination of the second search space and the third search space; and
   the first downlink control channel decoding candidate comprises a first number of control channel elements (CCEs) in the second search space and a second number of CCEs in the third search space.

10. The method of claim 9, wherein the second number of PRBs comprises one, two, or four PRBs.

11. The method of claim 9, wherein the first number of PRBs comprises six PRBs.

12. The method of claim 9, further comprising transmitting different sets of downlink control channel decoding candidates within each of the first, second, and third search spaces.

13. The method of claim 9, wherein the first search space comprises a single downlink control channel decoding candidate.

14. The method of claim 9, wherein the resources corresponding to the first, second, or third downlink control channel decoding candidate comprise a set of subframes, and wherein the set of subframes comprises two or more subframes.

15. The method of claim 14, further comprising transmitting an indication indicating the set of subframes to monitor.

16. The method of claim 9, wherein the narrowband size is within a wider system bandwidth.

17. The method of claim 9, wherein the narrowband size is based on at least one of a category of the UE or a capability of the UE.

18. An apparatus for wireless communications by a user equipment (UE), comprising:
at least one processor;
memory coupled to the at least one processor, the memory comprising code executable by the at least one processor to cause the UE to:
identify, within a subframe, a first search space spanning a first number of physical resource blocks (PRBs) that represents a narrowband size;
monitor the first search space for a first downlink control channel candidate;
monitor a second search space spanning a second number of PRBs for a second downlink control channel decoding candidate, wherein the second number of PRBs is fewer than the first number of PRBs; and
monitor a third search space spanning a third number of PRBs for a third downlink control channel decoding candidate, wherein the third number of PRBs is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

19. An apparatus for wireless communications by a base station (BS), comprising:
at least one processor;
memory coupled to the at least one processor, the memory comprising code executable by the at least one processor to cause the BS to:
identify, within a subframe, a first search space spanning a first number of physical resource blocks (PRBs) that represents a narrowband size;
transmit resources in the first search space corresponding to a first downlink control channel decoding candidate for a use equipment (UE) to monitor;
transmit resources in a second search space corresponding to a second downlink control channel decoding candidate for the UE to monitor, wherein the second search space spans a second number of PRBs that is fewer than the first number of PRBs; and
transmit resources in a third search space corresponding to a third downlink control channel decoding candidate for the UE to monitor, wherein the third search space spans a third number of PRBs that is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

20. The method of claim 1, wherein the first number of CCEs comprises 8 CCEs and the second number of CCEs comprises 8 CCEs.

21. The method of claim 1, wherein monitoring for the first downlink control channel decoding candidate is performed according to a pre-defined index.

22. The method of claim 21, wherein the pre-defined index indicates one of:
the second search space followed by the third search space; or
the third search space followed by the second search space.

23. The method of claim 21, wherein the pre-defined index is different for different UEs.

24. The method of claim 9, wherein the first number of CCEs comprises 8 CCEs and the second number of CCEs comprises 8 CCEs.

25. The method of claim 9, wherein the first downlink control channel decoding candidate is indexed according to a pre-defined index.

26. The method of claim 25, wherein the pre-defined index indicates one of:
the second search space followed by the third search space; or
the third search space followed by the second search space.

27. The method of claim 25, wherein the pre-defined index is different for different UEs.

28. An apparatus for wireless communications by a user equipment (UE), comprising:
means for identifying, within a subframe, a first search space spanning a first number of physical resource blocks (PRBs) that represents a narrowband size;
means for monitoring the first search space for a first downlink control channel decoding candidate;
means for monitoring a second search space spanning a second number of PRBs for a second downlink control channel decoding candidate, wherein the second number of PRBs is fewer than the first number of PRBs; and
means for monitoring a third search space spanning a third number of PRBs for a third downlink control channel decoding candidate, wherein the third number of PRBs is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

29. An apparatus for wireless communications by a base station (BS), comprising:
means for identifying, within a subframe, a first search space spanning a first number of physical resource blocks (PRBs) that represents a narrowband size;
means for transmitting resources in the first search space corresponding to a first downlink control channel decoding candidate for a user equipment (UE) to monitor;
means for transmitting resources in a second search space corresponding to a second downlink control channel decoding candidate for the UE to monitor, wherein the second search space spans a second number of PRBs that is fewer than the first number of PRBs; and
means for transmitting resources in a third search space corresponding to a third downlink control channel decoding candidate for the UE to monitor, wherein the third search space spans a third number of PRBs that is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

30. A computer-readable medium for wireless communications by a user equipment (UE), the computer-readable medium comprising code executable by at least one processor to cause the UE to:
identify, within a subframe, a first search space spanning a first number of physical resource blocks (PRBs) that represents a narrowband size;
monitor the first search space for a first downlink control channel decoding candidate;
monitor a second search space spanning a second number of PRBs for a second downlink control channel decoding candidate, wherein the second number of PRBs is fewer than the first number of PRBs; and
monitor a third search space spanning a third number of PRBs for a third downlink control channel decoding candidate, wherein the third number of PRBs is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

31. A computer-readable medium for wireless communications by a base station (BS), the computer-readable medium comprising code executable by at least one processor to cause the BS to:
identify, within a subframe, a first search space spanning a first number of physical resource blocks (PRBs) that represents a narrowband size;
transmit resources in the first search space corresponding to a first downlink control channel decoding candidate for a user equipment (UE) to monitor;
transmit resources in a second search space corresponding to a second downlink control channel decoding candidate for the UE to monitor, wherein the second search space spans a second number of PRBs that is fewer than the first number of PRBs; and
transmit resources in a third search space corresponding to a third downlink control channel decoding candidate for the UE to monitor, wherein the third search space spans a third number of PRBs that is fewer than the first number of PRBs and the second number of PRBs, wherein:
the first search space comprises a combination of the second search space and the third search space; and
the first downlink control channel decoding candidate comprises a first number of control channel elements (CCEs) in the second search space and a second number of CCEs in the third search space.

* * * * *